(12) United States Patent
Habraken

(10) Patent No.: US 6,382,798 B1
(45) Date of Patent: May 7, 2002

(54) OPTICAL DEVICE FOR PROJECTION DISPLAY SYSTEM

(75) Inventor: Serge Habraken, Comblain-au-Pont (BE)

(73) Assignee: Universite de Liege, Liege (BE)

( * ) Notice: Subject to any disclaimer, the term of this patent is extended or adjusted under 35 U.S.C. 154(b) by 0 days.

(21) Appl. No.: 09/551,731

(22) Filed: Apr. 18, 2000

(30) Foreign Application Priority Data

May 28, 1999 (EP) .............................. 99201728

(51) Int. Cl.⁷ .................. G03B 21/14; G03B 3/00; G02B 5/32; H04N 9/31; H04N 5/89
(52) U.S. Cl. .................. 353/122; 353/42; 353/101; 359/15; 359/30; 348/40; 348/744; 348/745
(58) Field of Search .................. 348/40, 744, 745; 359/15, 30, 31; 353/122, 101, 42

(56) References Cited

U.S. PATENT DOCUMENTS

| | | | |
|---|---|---|---|
| 4,280,135 A | 7/1981 | Schlossberg | 358/93 |
| 5,024,494 A | 6/1991 | Williams et al. | 350/3.6 |
| 5,221,957 A | 6/1993 | Jannson et al. | 356/301 |
| 5,235,363 A | 8/1993 | Vogeley et al. | 353/122 |
| 5,440,114 A | 8/1995 | Barbier et al. | 250/206.2 |
| 5,738,429 A | 4/1998 | Tagawa et al. | 353/122 |
| 5,831,601 A | * 11/1998 | Vogeley et al. | 345/175 |
| 6,050,690 A | 4/2000 | Shaffer et al. | 353/122 |
| 6,301,027 B1 | * 10/2001 | Popovich | 359/15 |

FOREIGN PATENT DOCUMENTS

| | | | |
|---|---|---|---|
| EP | 0 686 935 | 12/1995 | G06K/11/08 |
| WO | WO97/41502 | 11/1997 | G06F/3/00 |

OTHER PUBLICATIONS

Calixto, S. et al., "Relief Optical Microelements Fabricated with Dichromated Gelatin", Applied Optics, vol. 36, No. 10, Apr. 1, 1997 (pp. 2101–2106).

Shankoff, T.A., "Phase Holograms in Dichromated Gelatin", Appled Optics, vol. 7, No. 10, Oct. 1968, pp. 2101–2105.

* cited by examiner

Primary Examiner—Russell Adams
Assistant Examiner—Melissa Koval
(74) Attorney, Agent, or Firm—Jacobson Holman, PLLC

(57) ABSTRACT

An optical device for projection display system comprising:
a LCD projector, a luminescent spot projector for forming a luminescent spot on a screen, a luminescent spot extracting means for extracting light from the luminescent spot out of a reflected light from the screen, a luminescent spot detecting means for detecting the reflected luminescent spot and a luminescent control means for controlling a display image forming operation of the LCD projector based on the detection signal wherein the luminescent spot extracting means is an holographic mirror optically processed at, at least one wavelength of the luminescent spot projector.

11 Claims, 5 Drawing Sheets

OPTICAL DEVICE FOR PROJECTION DISPLAY SYSTEM

The present invention is related to an optical device for projection display system, particularly for a LCD projector.

Optical device for projection display system are known in the art. Japanese patent Laid-Open Publication No. HEI 5-224636 describes a system comprising a LCD matrix. The display image from the LCD matrix is transmitted through a beam-splitter mirror and a projection lens and then projected on a screen. On the other hand, a luminescent spot is generated from a light pointer and the luminescent spot is reflected on the screen. Light of the display image and the luminescent spot on the screen travels through the projection lens. Then, only the luminescent spot is reflected on the beam-splitter mirror and the reflected luminescent spot reaches a sensor means through a return image lens and an image reduction lens. The sensor means detects the position of the luminescent spot relative to the display image, and transmits the resultant information to a computer. The luminescent spot is implemented by Infra-Red light, while the beam-splitter mirror is implemented by a dichroic mirror. The beam-splitter mirror is capable of projecting on the screen visible light constituting the display image of the LCD matrix and selectively reflecting only the luminescent spot constituted by the Infra-Red light, thereby allowing the luminescent spot to be guided to a return image lens.

Such a system provides problems. For example, the beam-splitter mirror is arranged in the projection optical path, a deterioration of the display image may occur due to reflection and scattering. Furthermore the luminescent spot is implemented by an Infra-Red and then invisible light. Therefore, in order to allow an operator to be able to review a position designated by the light pointer on the screen, the light pointer is required to emit an outgoing light including both visible and invisible light. On the other hand, even when both visible and Infra-Red light are used, the luminescent spot is not clearly identified on the screen. Such unclear identification of the spot on the screen is due to a poor luminescent spot light intensity compared to a background brightness outgoing from the LCD matrix. The unclear identification of the spot is also resulting from a too high speed of movement and a small size of the luminescent spot.

An object of the present invention is to provide an improved optical device for projection display system capable of clearly identifying a luminescent spot on a screen.

We have now found that replacing a dichroic mirror by a holographic mirror optically processed at a particular wavelength, allows for a better transmission of the visible light and is better adapted to extract light from a selected wavelength without compromising a display image out-coming from a display image forming means. Moreover with an holographic mirror there is no need for an Infra-Red laser pointer.

The present invention provides an optical device for projection display system comprising:

a display image forming means for forming a display image to be projected on a screen, a luminescent spot projector for forming a luminescent spot on the screen, a luminescent spot extracting means for extracting light from the luminescent spot out of a reflected light from the screen, a luminescent spot detecting means for detecting a reflected luminescent spot upon receiving the light from the luminescent spot extracting means, a luminescent control means responsive to a detection signal representing the luminescent spot detected by the luminescent spot detecting means, for controlling a display image forming operation of the display image forming means based on the detection signal characterised in that the luminescent spot extracting means is an holographic mirror optically processed at, at least one wavelength of the luminescent spot projector.

In the present invention, the display image from the display image forming means is emitted through an image focussing means and projected on the screen. The light emitted from the luminescent spot projector forms a luminescent spot on the screen. A reflected and scattered light from the display image and the luminescent spot projected on the screen is incident on the holographic mirror arranged between the screen and the display image forming means. The holographic mirror extracts light from the luminescent spot out of the incident light and transmit it to a luminescent spot detecting means. Then, the display control means receives a signal representing the spot detected by the luminescent spot detecting means and controls the display image forming operation of the display image forming means.

That is according to the invention, the holographic mirror is arranged to have a role of concurrently transmitting the display image on the screen and a role of extracting the luminescent spot from the reflected light on the screen.

An advantage of the holographic mirror is its capacity to reflect light from the luminescent spot without compromising the display image out-coming from the display image forming means. Such capacity is due to a very high wavelength selectivity of the holographic mirror that plays a role of filtering a very specific and narrow band of frequency from the incident light.

Preferably the display image forming means is a LCD projector and the luminescent spot projector is a laser pointer.

The laser pointer may have a wavelength in visible or Infra-Red range. Most preferably the laser pointer has a wavelength in the visible range. The most preferred laser pointer has a wavelength between 640 and 670 nm.

In an optical device according to the invention, the luminescent spot detecting means comprises a detector such as a Charge Coupled Device (CCD) or a Position Sensitive Device (PSD) but preferably comprises a Position Sensitive Device (PSD). The luminescent spot detecting means may also comprise a focusing means for focusing on the detector, light out-coming from the holographic mirror.

The luminescent control means responsive to a detection signal from the luminescent spot detecting means is controlling the display image operation of the display image forming means. Such display control means is preferably a data processor with, for example, a computer code to execute specific commands such as underlining the luminescent spot or for a remote control of designated software commands. The remote control may be for example to go to next page, to go to previous page, to blacken the screen, to underline options i.e. size, colour shape, persistence of vision delay.

The holographic mirror is preferably made of a coating applied on an optically transparent substrate. The optically transparent substrate may be glass or any optically transparent plastic material. The coating is most preferably a dichromated gelatine or a photopolymer. The gelatine or the photopolymer have a thickness on the substrate that may vary between 5 to 100 micron, preferably between 30 to 60 micron.

The photopolymer coated on a substrate is commercially available whereas the gelatine is prepared according to a process described in Applied Optics 7,2101(1968).

In an optical device according to the invention, the wavelength selectivity of the holographic mirror is resulting from an optical pre-treatment of the coating applied on a substrate. Such optical pre-treatment comprises two steps: a first step, called geometry determination of the mirror and a second step called holographic recording. In such recording, the coating having n as refractive index and which is sensitive in a wavelength range is irradiated with a laser light such as a Ar laser light and recorded by interference between two coherent laser beams. An interference angle, also called recording angle between both laser beams determines the wavelength of a reflection peak, the wavelength selectivity of the holographic mirror.

The geometry determination and the holographic recording are guided by the following equation:

$$2\,nT\,\cos(alpha) = lambda \quad (1)$$

where n is the refractive index of the coating,

T represents a fringe spacing or a Bragg plane spacing and determines a geometry of the mirror, alpha represents the recording or reading angle with respect to the normal inside the coating of refractive index n and lambda represents a recording wavelength.

In the first step, the geometry of the mirror is calculated from a reading angle configuration, applying equation (1) above. Such geometry will be necessary to obtain a holographic mirror with a wavelength selectivity at lambda.

For example, for a coating with n=1.5, for alpha equal 14.78 degree inside the coating or 22.5 degree in the air and at lambda=650 nm, the required Bragg plane spacing, T, is 224.1 nm.

That means that a holographic mirror made of a coating with n=1.5 will be efficiently reflecting light at 650 nm under an incident angle of 22.5 degree in the air, if the Bragg plane spacing of the mirror is 224.1 nm.

In the second step the holographic recording is determined with a laser light such as an Ar laser light. With an Ar laser light, lambda equals 514.5 nm. If the coating has n=1.5 and T=224.1 nm, the recording angle will be 40.1 degree inside the coating.

If the wavelength selectivity of the mirror need to be tuned at 660 nm instead of 650 nm, the reading angle alpha will be 11 degree inside the coating and 16.6 degree in the air.

When the holographic mirror has been recorded by interference to be tune to at least one particular wavelength, it may be submitted to UV exposure to cure the coating. The holographic mirror is then fixed on a support and further arranged in the optical device between the display image forming means and the screen.

According to one preferred embodiment of the invention, the holographic mirror is mount on a support provided to rotate to generate various angle of incidence with the reflected and scattered light from the screen. Each angle of incidence corresponds to a specific wavelength of a luminescent spot projector. In such embodiment, one holographic mirror can advantageously be used for different luminescent spot projectors having a different wavelength.

According to another preferred embodiment, the holographic mirror is mounted on a filter wheel together with additional holographic mirrors of different wavelength selectivity. In such a preferred embodiment, the filter wheel may be rotated, in order to select the holographic mirror having the wavelength selectivity in accordance with a wavelength emission of a laser pointer. Each mirror is tuned to reflect light in a small wavelength range. For example, if the filter wheel comprised 4 holographic mirrors, the first mirror may reflect from 640 nm to 648 nm, the second mirror from 646 to 654 nm, the third from 652 to 660 nm and the fourth from 658 to 666 nm.

Advantageously, any commercial and cheap laser pointer may be used in an optical device of the present invention.

Another object of the present invention is to provide a process for preparing a holographic mirror for an optical device for projection display system characterised in that the holographic mirror is tuned to reflect light in a wavelength range corresponding to at least one wavelength of a luminescent spot projector.

The process comprises two steps as defined above, the first step to determine the geometry of the mirror and a second step to record the holographic mirror at, at least one particular wavelength. The process may also include a step of curing the coating by conventional methods such as UV exposure.

In order that the invention may become clearer, there now follows a detailed description to be read with the accompanying drawings. It is to be understood that the illustrative device has been selected for description to illustrate the invention by way of examples and not by way of limitation thereof.

Figure 1:
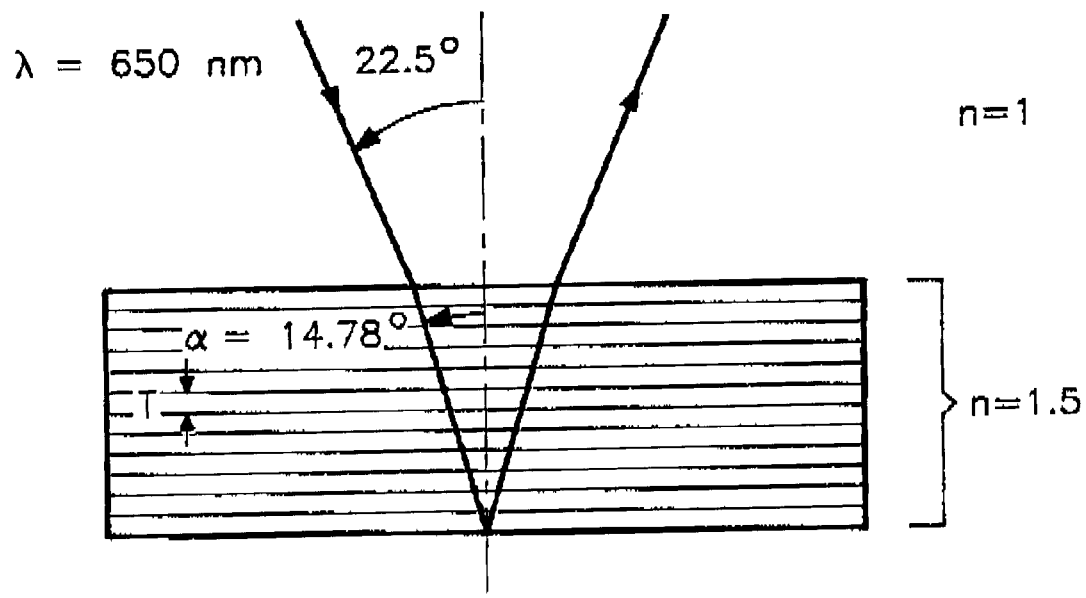
FIG. 1 is a drawing illustrating the geometry determination for a coating with n=1.5, for alpha equal 14.78 degree inside the coating or 22.5 degree in the air and at lambda =650 nm.
Figure 2:
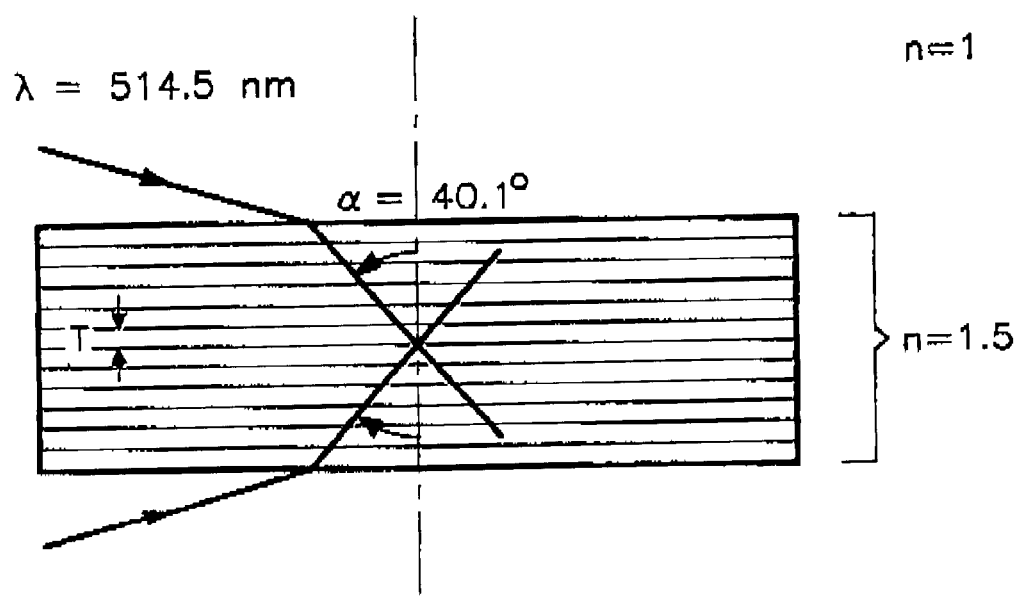
FIG. 2 is a drawing illustrating the recording with an Ar laser light of 514.5 nm. If the coating has n=1.5 and T=224.1 nm, the recording angle will be 40.1 degree.
Figure 3:
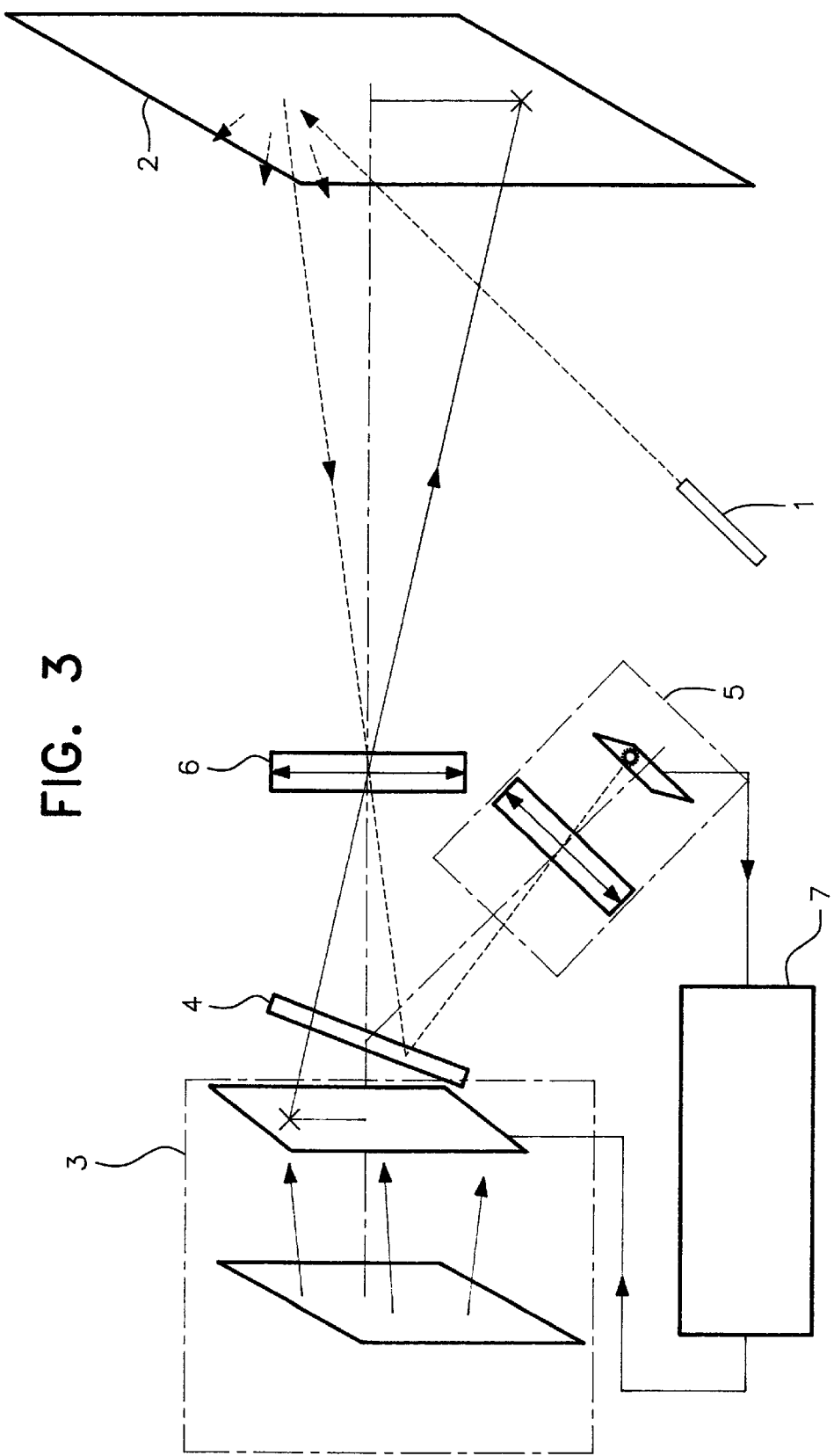
FIG. 3 is a schematic drawing of a preferred embodiment wherein the display image forming means is a LCD matrix and the luminescent spot projector is a laser pointer.

According to a preferred embodiment, FIG. 3 shows a display image emitted from a LCD projector (3) through a projection lens (6) and projected on a screen (2). Light emitted from a laser pointer (1) forms a luminescent spot on the screen (2). A reflection light from the display image and the luminescent spot projected on the screen (2) is incident on the holographic mirror (4) arranged between the screen (2) and the LCD projector (3). The holographic mirror (4) extracts light from the luminescent spot out of the incident light and transmit it to a detecting means (5) comprising a PSD and a system of focusing lenses. Then, the display control means (7) receives a signal representing the spot detected by the PSD in the luminescent spot detecting means (5) and controls the display image forming operation of the LCD matrix in the LCD projector (3). The display control means is a computer that executes a command for a remote interactive LCD matrix as for example a persistence of vision effect.

Figure 4:
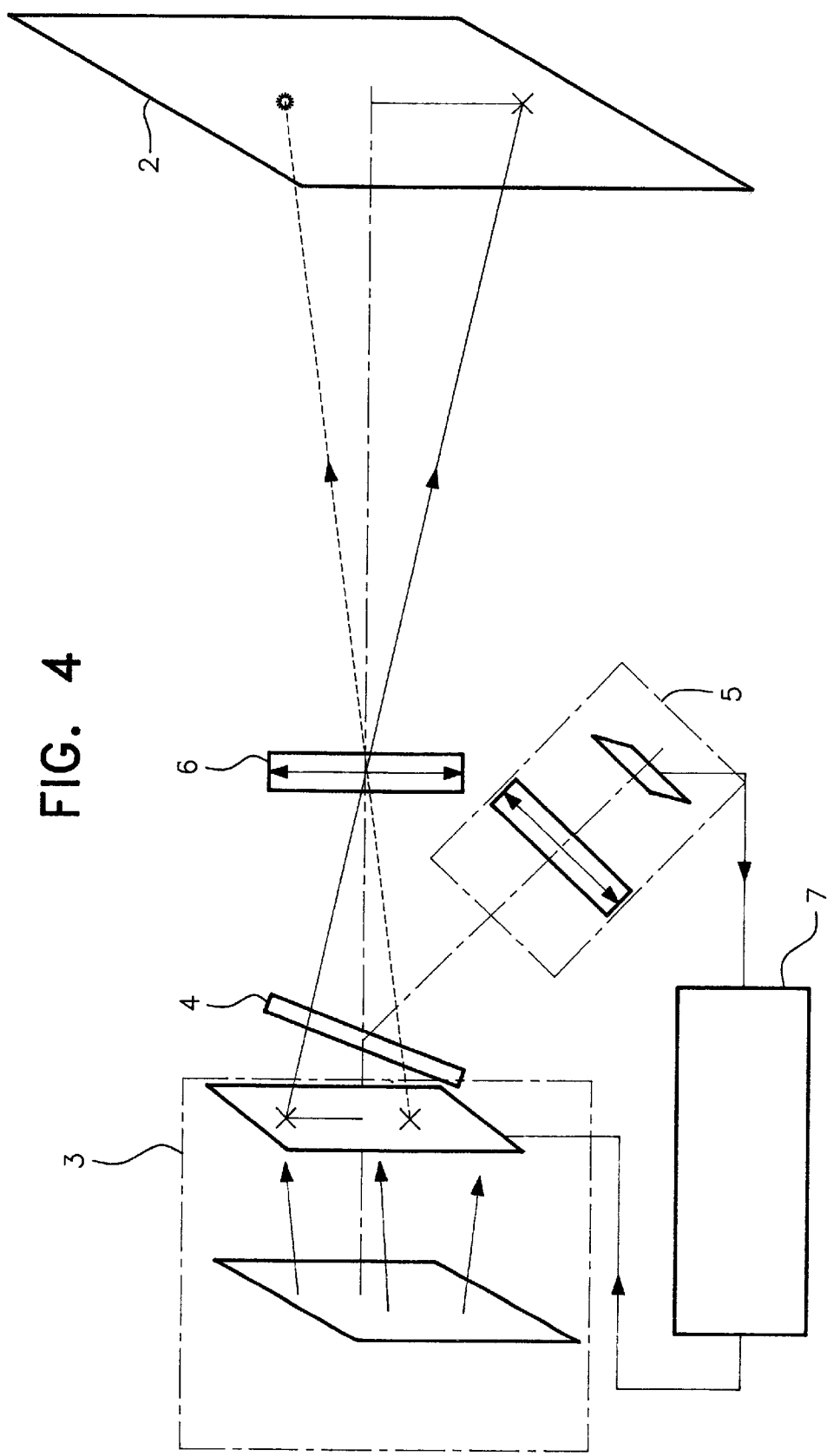
FIG. 4 is a schematic drawing of the preferred embodiment of FIG. 3, illustrating a remote interactive operation by projection of a persistence effect.

FIG. 4 shows the projection of the persistence effect by a remote interactive operation with the preferred embodiment of FIG. 3.

Figure 5:
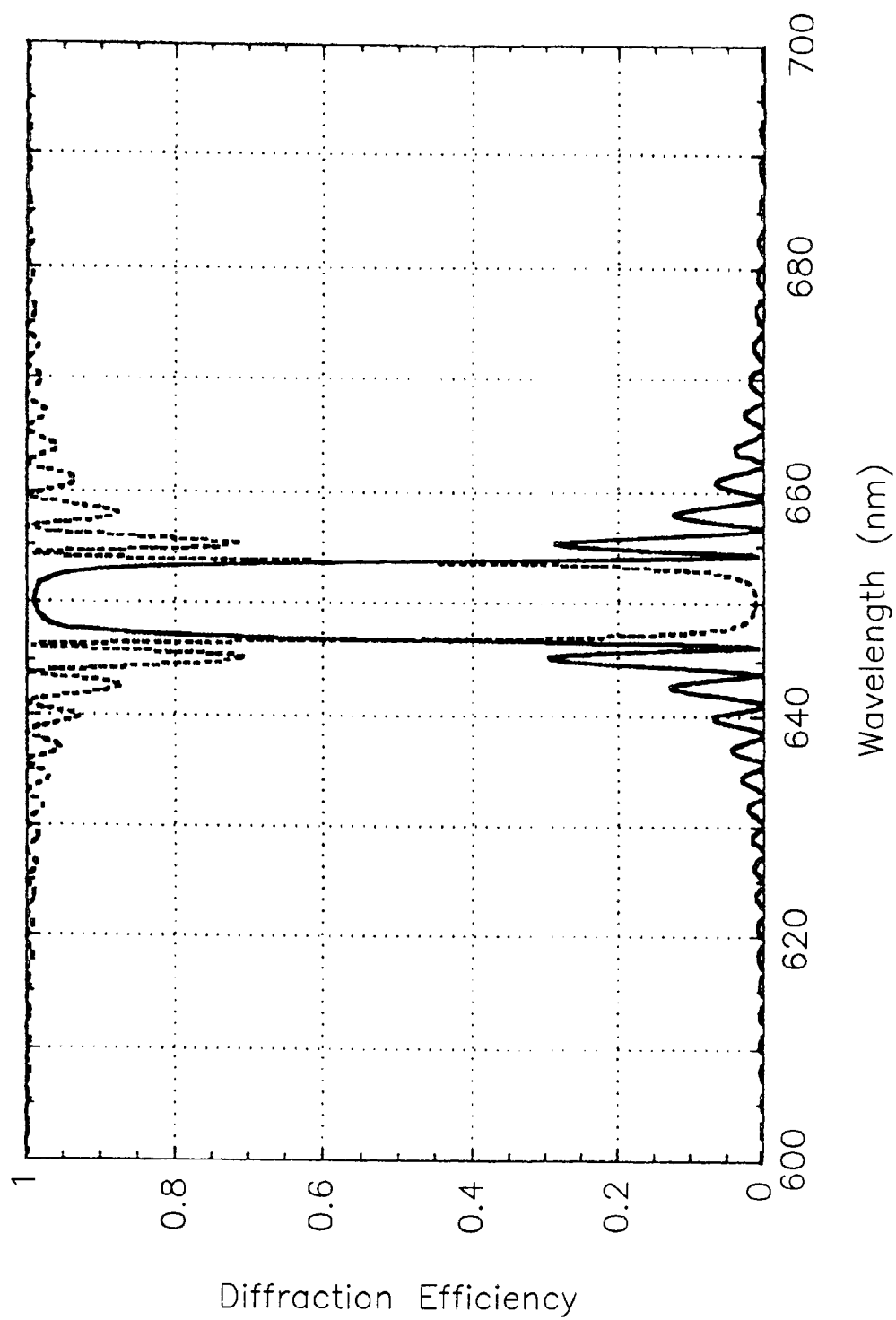
FIG. 5 shows a hologram reflectivity of a mirror designed and tuned for a laser pointer emitting at 650 nm. Reflectivity is represented in continuous line and transmissivity in dotted line.

In order to achieve a holographic mirror according to the preferred embodiment of FIG. 3, with a high wavelength selectivity and an hologram reflectivity over a narrow wavelength bandwidth inferior to 10 nm, a simulation based on diffraction grating theory has been performed to optimise several parameters of the holographic mirror. It has been found that using a recorded photopolymer of mean refractive index of 1.5, such as a recorded photopolymer HRF600 commercialised by dupont de Nemours, a diffraction efficiency close to 1 may be obtained with a refractive index modulation of 0.01 inside the hologram. When the photopolymer is coated on a glass substrate with a thickness of 50 micron and when an angle of incidence is optimised at 22.5 degree for a laser pointer of 650 nm; a grating period of 224.1 nm with fringes orientation parallel to the substrate is obtained. FIG. 5 shows the recorded hologram reflectivity (represented in continuous line) and transmissivity (represented in doted line) corresponding to the laser pointer of 650 nm. A wavelength selectivity of 7 nm FWHM(full Width at Half maximum) is obtained.

The hologram reflectivity is centred around 650 nm with more than 98% efficency inside the hologram or 90% taking into account Fresnel reflection loss due to substrate-air interfaces. Transmissivity is very low and inferior to 2% at 650 nm. Transmissivity loss is very well confined around 650 nm. Values close to 100% transmissitivity are retrieved out of the wavelength band.

Figure 6:
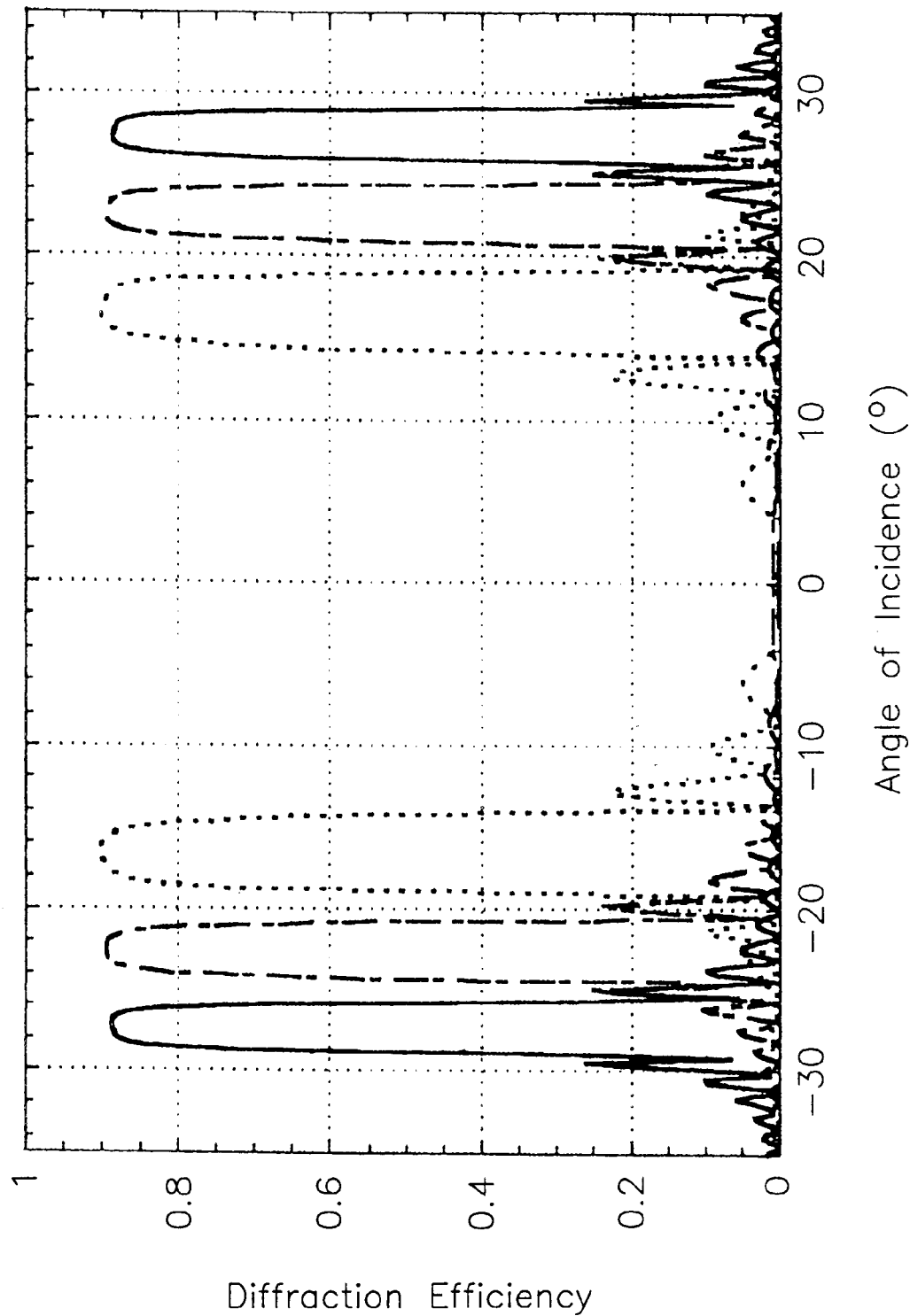
FIG. 6 shows a hologram reflectivity of a holographic mirror tuned for use with different laser pointers emitting at different wavelengths and when the mirror may be rotated by a few degrees. Reflectivity at 640 nm is represented in continuous line, reflectivity at 650 nm in dashed line and at 660 in dotted line.

In FIG. 6, the preferred embodiment of FIG. 3 has been used with several laser pointers emitting at other wavelength than 650 nm. By rotating the holographic mirror on his support and consequently generating various angle of incidence with the reflected light from the screen, one can tune a holographic mirror to a laser pointer of 640, 650 or 660 nm. For example, FIG. 6 reproduces the reflectivity (represented in continuous line) of the holographic mirror when using a laser pointer emitting at 640 nm, and when the reflected light has an incident angle of 27.75 degree.

The reflectivity (represented in dotted line) of the holographic mirror is also given when using a laser pointer emitting at 660 nm and when the incident angle is shifted to 17.2 degree. The three reflectivities are obtained with a wavelength selectivity of 7 nm FWHM and 90% efficiency taking into account Fresnel reflection loss.

What is claimed is:

1. An optical device for projection display system comprising:
    a display image forming means (3) for forming a display image to be projected on a screen(2),
    a luminescent spot projector (1) for forming a luminescent spot on the screen(2),
    a luminescent spot extracting means (4) for extracting light from the luminescent spot out of a reflected light from the screen,
    a luminescent spot detecting means (5) for detecting a reflected luminescent spot upon receiving the light from the luminescent spot extracting means,
    a luminescent control means (7) responsive to a detection signal representing the luminescent spot detected by the luminescent spot detecting means, for controlling a display image forming operation of the display image forming means based on the detection signal characterised in that the luminescent spot extracting means (4) is an holographic mirror optically processed at, at least one wavelength of the luminescent spot projector.

2. An optical device according to claim 1 characterised in that the display image forming means (3) is a LCD projector and the luminescent spot projector (1) is a laser pointer.

3. An optical device according to claim 2 characterised in that the laser pointer (1) has a wavelength in visible range.

4. An optical device according to claim 3 characterised in that the laser pointer (1) has a wavelength between 640 and 670 nm.

5. An optical device according to claim 1 characterised in that the luminescent spot detecting means (5) comprises a Position Sensitive Device (PSD).

6. An optical device according to claim 1 characterised in that the luminescent control means (7) is a data processor.

7. An optical device according to claim 1 characterised in that the holographic mirror (4) is made of a coating applied on an optically transparent substrate.

8. An optical device according to claim 7 characterised in that the coating is a photopolymer.

9. An optical device according to claim 7 characterised in that the coating is a dichromated gelatine.

10. An optical device according to claim 1 characterised in that the holographic mirror (4) is mounted on a support provided to rotate.

11. A Process for preparing a holographic mirror for an optical device for projection display system characterised in that the holographic mirror is tuned to reflect light in a wavelength range corresponding to at least one wavelength of a luminescent spot projector.

* * * * *